(12) United States Patent
Dawson et al.

(10) Patent No.: US 12,323,173 B2
(45) Date of Patent: Jun. 3, 2025

(54) SENSING OF ANTENNA CONNECTION FOR REMOTE RADIO HEADS

(71) Applicant: TalkingHeads Wireless, Inc., Roslindale, MA (US)

(72) Inventors: Joel L. Dawson, Roslindale, MA (US); Mark A. Briffa, Tyreso (SE)

(73) Assignee: TalkingHeads Wireless, Inc., Roslindale, MA (US)

( * ) Notice: Subject to any disclaimer, the term of this patent is extended or adjusted under 35 U.S.C. 154(b) by 482 days.

(21) Appl. No.: 17/592,502

(22) Filed: Feb. 3, 2022

(65) Prior Publication Data

US 2022/0209798 A1 Jun. 30, 2022

Related U.S. Application Data

(63) Continuation-in-part of application No. 17/525,392, filed on Nov. 12, 2021, now Pat. No. 11,990,926.

(60) Provisional application No. 63/112,534, filed on Nov. 11, 2020, provisional application No. 63/112,515, filed on Nov. 11, 2020, provisional application No. 63/112,526, filed on Nov. 11, 2020, provisional application No. 63/112,542, filed on Nov. 11, 2020.

(51) Int. Cl.
*H04B 1/04* (2006.01)
*H04B 1/12* (2006.01)

(52) U.S. Cl.
CPC ......... *H04B 1/0466* (2013.01); *H04B 1/0458* (2013.01); *H04B 1/0475* (2013.01); *H04B 1/12* (2013.01); *H04B 2001/0408* (2013.01)

(58) Field of Classification Search
None
See application file for complete search history.

(56) References Cited

U.S. PATENT DOCUMENTS

| | | | | |
|---|---|---|---|---|
| 8,170,079 | B2* | 5/2012 | Briles | H01Q 3/44 |
| | | | | 375/147 |
| 8,709,872 | B2* | 4/2014 | Rofougaran | H01Q 1/38 |
| | | | | 438/109 |
| 9,118,394 | B2* | 8/2015 | Black | H04B 1/401 |
| 9,374,125 | B1* | 6/2016 | Roberts | H04B 1/18 |
| 10,277,268 | B2* | 4/2019 | Shanjani | H04B 1/1615 |
| 10,498,298 | B1* | 12/2019 | Wang | H03F 3/191 |
| 10,895,634 | B2* | 1/2021 | Nath | H01Q 21/064 |
| 11,163,037 | B2* | 11/2021 | Bily | G01S 13/04 |
| 11,588,506 | B2* | 2/2023 | Shen | H03H 7/46 |

* cited by examiner

*Primary Examiner* — Pablo N Tran
(74) *Attorney, Agent, or Firm* — Daly, Crowley, Mofford & Durkee, LLP (57) ABSTRACT

Described are concepts, systems and techniques for detecting whether an impedance mismatch exists at an output port of a remote radio head (RRH) or at an output port of a radio frequency (RF) amplifier in an RRH such as may be caused by a faulty connection between an antenna and a transmit signal path of the RRH. Also described are means for protecting an RF amplifier or other active RF device in the transmit signal path from damage due to such a faulty connection.

14 Claims, 11 Drawing Sheets

SENSING OF ANTENNA CONNECTION FOR REMOTE RADIO HEADS

BACKGROUND

As is known, remote radio heads (RRHs) included as part of a cellular communication system include an RF transmit signal path through which radio frequency (RF) signals propagate from an RF source to an antenna through the RF transmit signal path. Such RF transmit signal paths typically include one or more power amplifiers (PAs). Outputs of each of the one or more PAs are coupled (either directly or indirectly) to the antenna. RF signals provided to an input of each PA are amplified and coupled, or otherwise provided to, an input of the antenna and subsequently emitted from the RRH via the antenna.

As is also known, RRHs (and in particular PAs within an RRH transmit signal path) can be severely damaged by supplying RF signals to a transmit signal path (and in particular by supplying RF signals to the input of a PA in the RRH) when one or more antennas are not properly connected or not otherwise properly coupled to the RF transmit signal path or the output of the PA.

SUMMARY

To address this issue, and in accordance with one aspect of the concepts, systems and techniques described herein, described is a mechanical means for detecting whether an antenna is electrically and/or mechanically connected to an antenna port of a remote radio head (RRH). Such mechanical means protect a power amplifier (PA) or a series of PAs (also sometimes referred to as a PA lineup) from damage by disabling or otherwise preventing the RRH from powering on and/or by alerting a controller in the RRH that or more antennas are not coupled to an antenna port of an RRH. Such mechanical means of detecting may thus lower the risk of operating an RRH with a substantially open circuit impedance (also sometimes referred to herein simply as an open connection) at an antenna port of the RRH.

Furthermore, in many systems, a circulator (or other protection circuit) is coupled between the PA and the antenna which protects the PA from exposure to signals reflected or otherwise directed back to the PA output port which would damage and possibly destroy the PA. Such a reflection of signal power may occur, for example, when a high voltage standing wave ratio (VSWR) condition (such as may be caused by an open circuit impedance) exists at the output port of the PA and/or at an antenna port of an RRH. Thus, inclusion of mechanical means for detecting an unconnected (or poorly connected) antenna at an RRH antenna port may also allow relaxation of requirements (e.g. power handling requirements) of or even obviate the need for a circulator (or other protection circuit) coupled between the output port of the PA and an input port of an antenna.

Thus, at least some benefits of including a mechanical means of detecting whether an antenna is electrically and/or mechanically connected to an RRH antenna port, include, but are not limited to, relaxing technical and/or design requirements such as insertion loss or return loss characteristics of a circulator (or other protection devices or circuits) coupled between a PA output port and an antenna may in turn may enable use of circulators (or other protection devices or circuits) having an insertion loss characteristic which is lower than an insertion loss characteristic which would otherwise be used.

Lowering the insertion loss of a circulator (or other protection devices or circuits) in a transmit signal path, in turn, raises the efficiency of the RF transmit system, and thus reduces the need for relatively large and heavy heatsinks in an RRH.

Since high bandwidth in RF systems (e.g., bandwidths of about 5% of a carrier frequency) typically leads to relatively low RF efficiency (e.g., efficiency of about 50% or less where efficiency is defined as the amount of RF output power produced by a PA from a given amount of dc input power), this results in RRHs that are large, heavy, and expensive to operate. Thus, utilization of mechanical means of detecting whether an antenna is electrically and/or mechanically connected to an RRH antenna port results in an RRH which is physically smaller (e.g. in certain dimensions and/or area and/or volume) and lighter (i.e. weigh less) than RRHs used in systems which do not include a mechanical means of detecting whether an antenna is electrically and/or mechanically connected to an RRH antenna port.

DESCRIPTION OF THE SEVERAL VIEWS OF THE DRAWINGS

The manner and process of making and using the disclosed embodiments may be appreciated by reference to the figures in the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
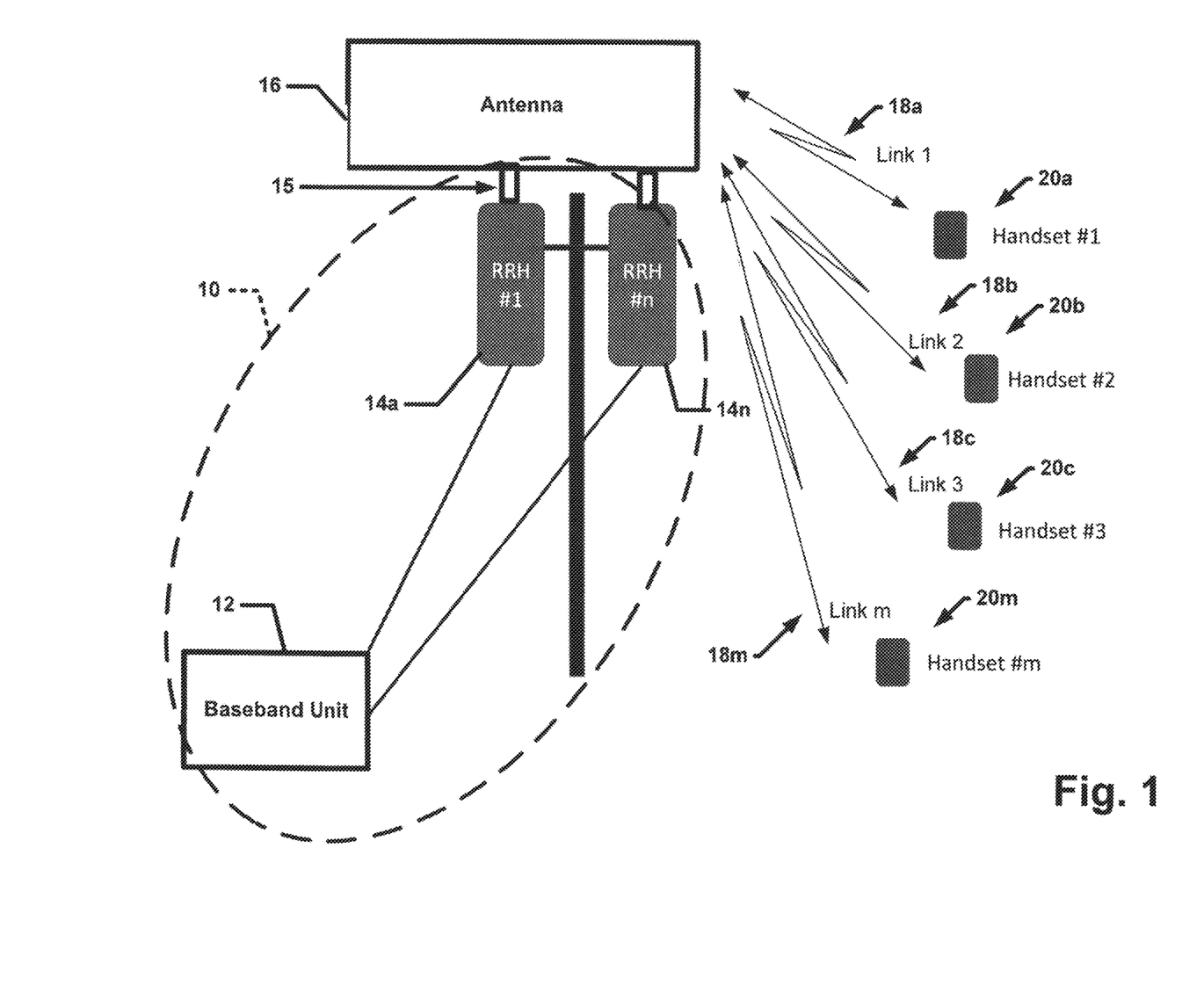
FIG. 1 is a block diagram of an example wireless communication system including a baseband unit and one or more remote radio heads (RRHs) coupled to one or more external antennas.

Referring now to FIG. 1, an illustrative cellular tower has one or more (here n) remote radio heads (RRHs) 14a-14n (generally denoted 14) coupled thereto. RRHs 14 may contain radio frequency (RF) circuitry in addition to analog-to-digital converters (ADCs) or digital-to-analog converters (DACs) and frequency translation circuits (e.g., up/down converters such as RF mixers). As will be described in detail below in conjunction with FIGS. 3, 5 and 7, the RRHs comprise one or more a transmit signal paths (sometimes referred to as "RF line-ups") with each transmit signal path comprising one or more power amplifiers (PAs).

A baseband unit 12 is communicatively coupled to the one or more remote radio heads (RRHs) 14a-14n. The baseband unit may be coupled to the RRHs using wireless techniques (e.g. microwave, millimeter wave (MMW), free space optics (FSO) links or using hard wire techniques (e.g., fiber optic cable). The RRHs 14 and baseband units 12 taken together form a distributed baseband unit (sometimes referred to as a distributed base station).

In at least some operating modes, the baseband unit and RRHs may establish communication links 18a-18m with corresponding ones of mobile communication devices 20a-20m. The mobile communication devices 20a-20m may correspond to handsets—e.g. smart phones, (including but not limited to iPhones, Android mobiles), tablet computers or any other type of mobile communication device.

RF signals (e.g. transmit signals) generated via the RRHs are emitted though antenna 16 and RF signals provided by handsets 20a-20m are received through antenna 16 and coupled or otherwise provided to the one or more RRHs 14. In some embodiments, antenna 16 may be provided having a substantially omnidirectional antenna pattern. In other embodiments, antenna 16 may be provided having other antenna patterns. In embodiments, antenna 16 may be provided as a multiple-input, multiple-output (MIMO) antenna. In embodiments, antenna 16 may be provided as a MIMO antenna having a substantially omnidirectional antenna pattern. Other antenna patterns may, of course, also be used. In embodiments, antenna 16 may be integrated with RRH 14. The baseband unit and RRHs are operable with GSM, CDMA, UMTS, LTE, 4G, 5G, 6G technologies.

Each RRH comprises an RF port coupled to a port of an external antenna via an RF connection 15. In embodiments, antenna 16 may be provided as a multiple-input, multiple-output (MIMO) antenna. RF connection 15 may comprise any type of RF connector including, but not limited to a coaxial connector. RF connection 15 may, for example, comprise an RF cable (e.g. a coaxial cable) having RF connectors (e.g. coaxial connectors) disposed on each end thereof.

In such RF cable embodiments, the RF connector on the first end of the RF cable is coupled to an RF port on the RRH and the RF connector on the second end of the RF cable is coupled to an RF port on the antenna. For example, when the RF cable and RF connector(s) are provided as a coaxial cable and coaxial connector(s) the coaxial connectors are coupled to a coaxial port on the RRH and the coaxial connector on the second end of the coaxial cable is coupled to a coaxial port on the antenna. If such coaxial connectors are not properly secured (e.g. not fastened to a specific torque, via a torque wrench for example) a relatively large voltage standing wave ratio (VSWR) (e.g. in some embodiments, a VSWR greater than about 2.0 and in some embodiments, a VSWR greater than about 3.0) may exist at the ports.

In general, connection 15 is considered to be not properly secured when the connection 15 (regardless of the manner in which the connection 15 is specifically made) causes, generates or otherwise results in an RF signal which is reflected or otherwise directed or re-directed toward the RF output port of the PA and has an amplitude (either in power or voltage) that would damage the PA if the re-directed signal reached the PA output port while the PA is powered on (i.e., biased in an operating mode).

The PAs can be damaged (e.g., severely damaged) by supplying RF power to an RRH transmit signal path (and in particular, by supplying RF signals to an input port of a PA) when connection 15 is not properly made (e.g. not properly secured in the case of a coaxial connector or a connection 15 which otherwise may result in a relatively large VSWR at the output port of the PA).

Figure 2:
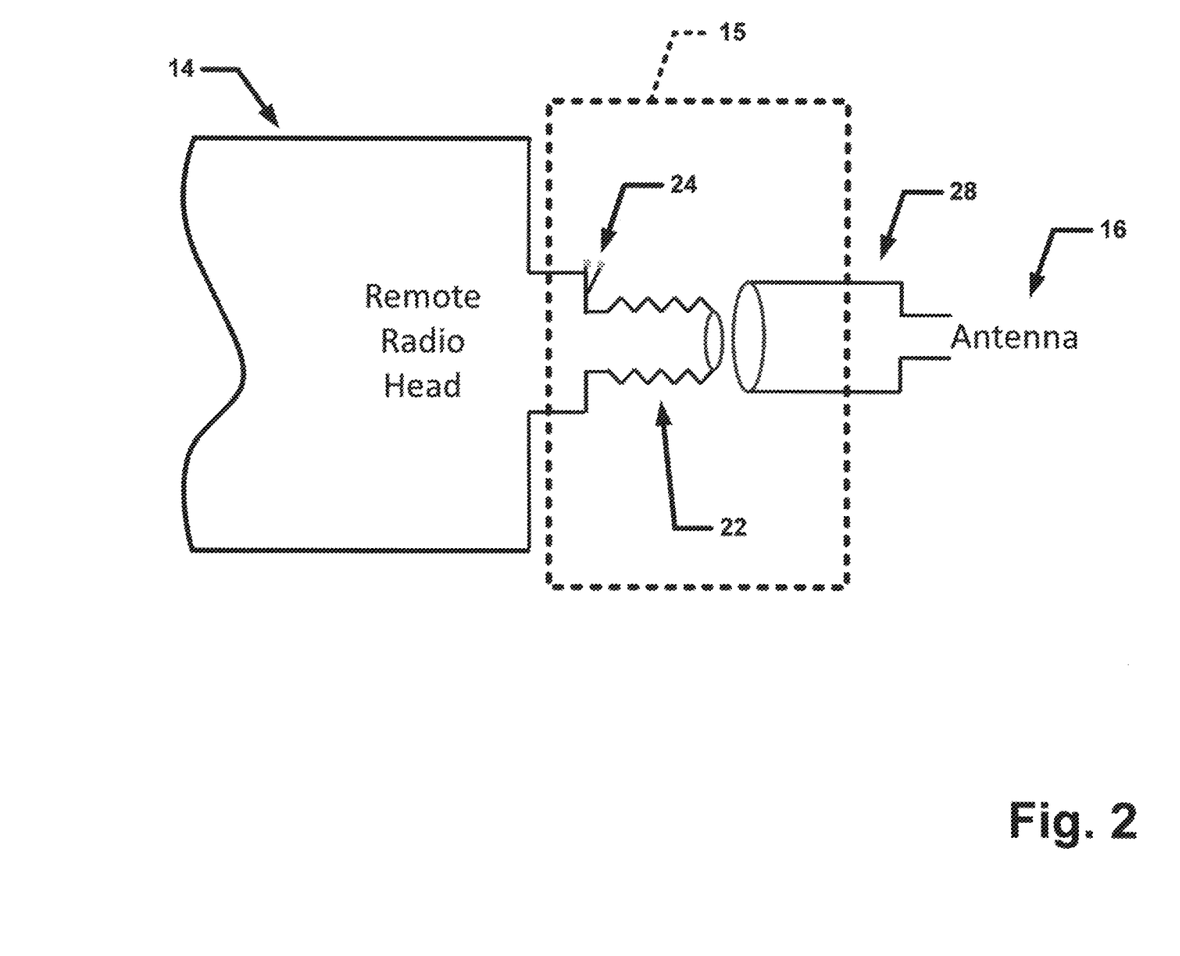
FIG. 2 is a schematic diagram of an illustrative mechanical switch having a spring-loaded contact arranged so as to provide an indication of when an antenna is coupled to an RRH.

To address this issue, and referring now to FIG. 2, described is a means 24 for detecting whether an antenna is electrically and/or mechanically connected to an RF antenna port 28 of RRH 14. It should be noted that the example embodiment of FIG. 2, illustrates a direct connection between the RRH 14 and antenna 16. As noted above, however, in some embodiments, an RF cable (e.g. a coaxial cable) having RF connectors (e.g., coaxial connectors or other type of RF connectors) coupled on each end thereof may be used to couple RRH 14 to antenna 16 in which case the connection 15 between RRH 14 and antenna port 22 comprises the RF cable and one or more RF connectors.

In the example embodiment of FIG. 2, the means is illustrated as a mechanical means comprising a spring-loaded contact switch 24 which provides a signal path having a first one of a substantially short circuit impedance characteristic or an open circuit impedance characteristic when an antenna port 28 of antenna 16 is fully coupled to the RRH port 22 and having second one of a substantially short circuit impedance characteristic or a substantially open circuit impedance characteristic (or a high resistance signal path characteristic) when the antenna port 17 is not fully coupled to the RRH antenna port 22. In one embodiment, "fully coupled" means the connector(s) between the RRH and the antenna is/are (ideally) torqued to an appropriate (and ideally specified) tension (or within a range of tensions) e.g. via a torque wrench. In the example of FIG. 2, the RRH antenna port is illustrated as a male coaxial connector and antenna port 28 is illustrated as a female coaxial connector to which the male coaxial connector mates.

Such mechanical means protects the PA (or a series of PAs also sometimes referred to as a "PA lineup") from damage by preventing or otherwise disabling the RRH from powering on and/or by alerting a controller in the RRH that one or more antennas is not coupled (or not fully coupled and/or not securely coupled) to an antenna port of an RRH. Such mechanical means of detecting may thus lower (and ideally, eliminate) the risk of operating an RRH when an impedance mismatch exists between the RRH (e.g. the output of a PA) and the antenna. Such an impedance mismatch may, for example, be a relatively large impedance mismatch such as a substantially open circuit impedance (also sometimes referred to herein simply as an open connection) at the PA antenna port of the RRH or at the output port of the PA.

In embodiments, means 24 for detecting whether an antenna is electrically and/or mechanically connected to an antenna port 22 of RRH 14 may comprise any type of mechanical sensor (e.g. a switch such as a contact switch or a mechanical strain sensor).

It should also be appreciated that in embodiments, the means 24 for detecting whether an antenna is electrically and/or mechanically connected to an antenna port 22 of RRH 14 may comprise any type of pressure sensor, or any type of optical sensor.

Furthermore, as will be described below in conjunction with FIGS. 3 and 5, in many systems, a circulator (or T/R switch or other protection circuit) may be coupled between the PA and the antenna. A circulator is a magnetic RF component which may be coupled between an output port of a PA and a port of the antenna. The circulator functions (or operates) to and protect the PA from exposure to excess power reflected back to the PA output port (e.g. from the antenna). Such a reflection of power may be caused, for example, by a relatively high impedance mismatch between mating ports of the RRH and the antenna. Such an impedance mismatch may manifest itself as a high voltage standing wave ratio (VSWR) condition (such as may be caused by an open circuit impedance) existing at an antenna port of an RRH (e.g. port 22 in FIG. 2). Thus, in accordance with the concepts described herein, it has been recognized that inclusion of means for detecting an unconnected or poorly connected antenna at an RRH antenna port may also allow relaxation of requirements (e.g. power handling requirements) of a circulator (or T/R switch other protection circuit) coupled between the PA output port and an antenna. Indeed, in some embodiments, it may be possible to eliminate a circulator component from an RF transmit signal path, thereby reducing an insertion loss characteristic of the transmit signal path. Lowering the insertion loss characteristic of a transmit signal path of an RRH increases the efficiency of an RRH transmit system.

Thus, at least some benefits of including a means for detecting whether an antenna is electrically and/or mechanically connected to an RRH antenna port, include, but are not limited to, relaxing the requirements of a circulator (e.g. technical and/or design requirements of a circulator such as a maximum allowable insertion loss of a circulator) coupled between a PA output port and an antenna. With this approach, a circulator having an insertion loss characteristic which is lower than insertion loss characteristics of circulators used in conventional RRHs may be used.

Lowering the insertion loss of a circulator in a transmit signal path of an RRH, in turn, raises the efficiency (i.e. the amount of RF output power produced by a PA from a given amount of dc input power) of the RF transmit signal path and thus of the RRH. Lowering the insertion loss of a circulator may also reduce the need for heatsinks in the RRH since portions of insertion loss energy may manifest itself as heat in the circulator.

Furthermore, increasing operational bandwidths of RF systems typically leads to decreasing efficiencies. Thus, lowering insertion loss characteristics of components in a transmit signal path of an RRH helps increase efficiency of the RRH and thus allows an RRH to operate over bandwidths which are larger than operational bandwidths of conventional RRHs.

Furthermore, circulators and other components having relatively high insertion loss characteristics generate heat and thus require relatively large (and thus heavy) heat sinks or sophisticated cooling structures and/systems which may also be relatively large and heavy to channel or otherwise absorb such heat. This results in RRHs that are large, heavy, and expensive to operate. Thus, utilization of means for detecting whether an antenna is electrically and/or mechanically connected to an RRH antenna port results in an RRH which is physically smaller (e.g., in area and/or volume) and lighter (i.e., less weight) than RRHs used in systems which do not include a means for detecting whether an antenna is electrically and/or mechanically connected to an RRH antenna port.

Figure 3A:
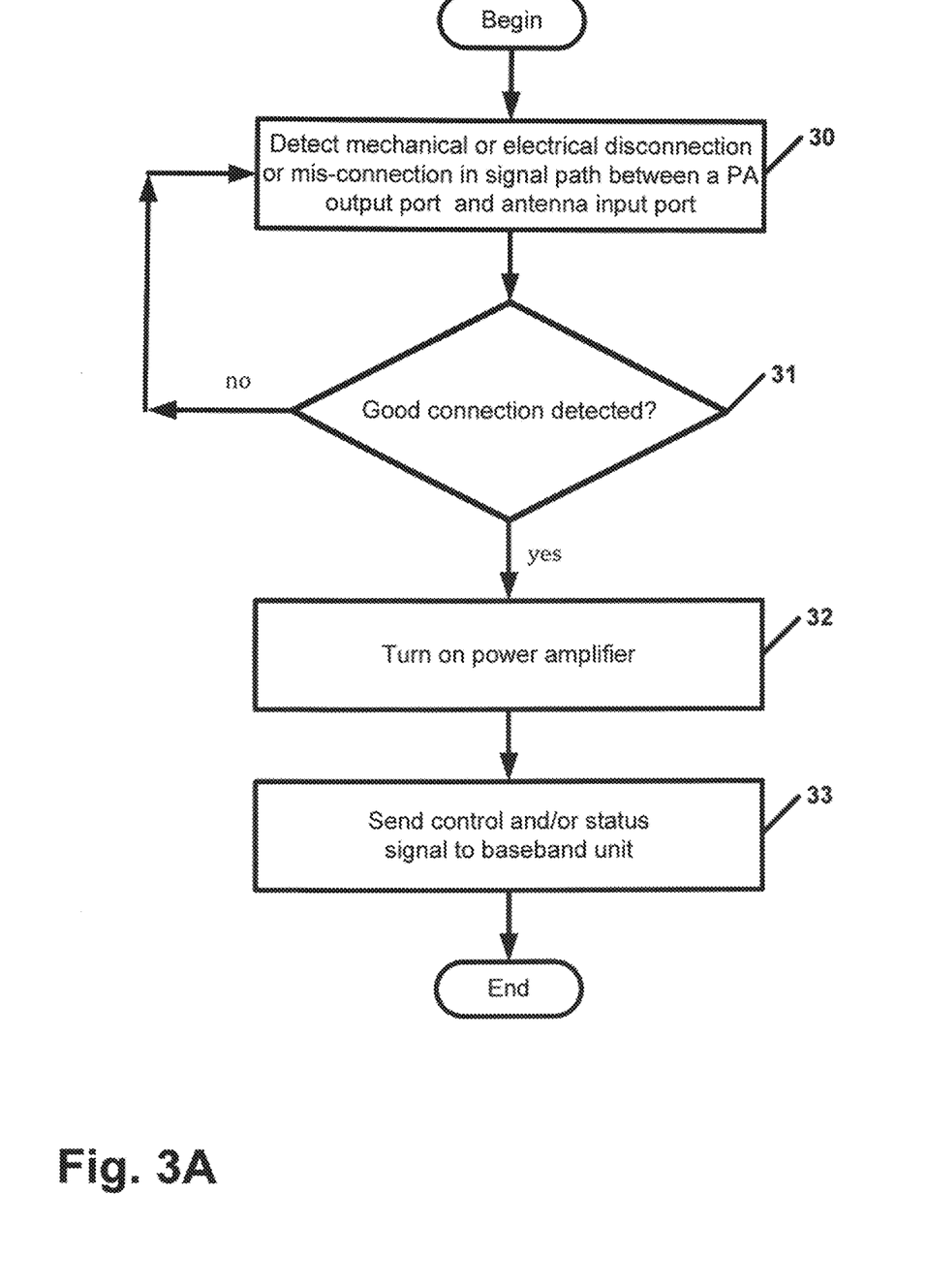
FIG. 3A is a flow diagram of a process for detecting an electrical connection between an RRH and an external antenna upon start-up.
Figure 3B:
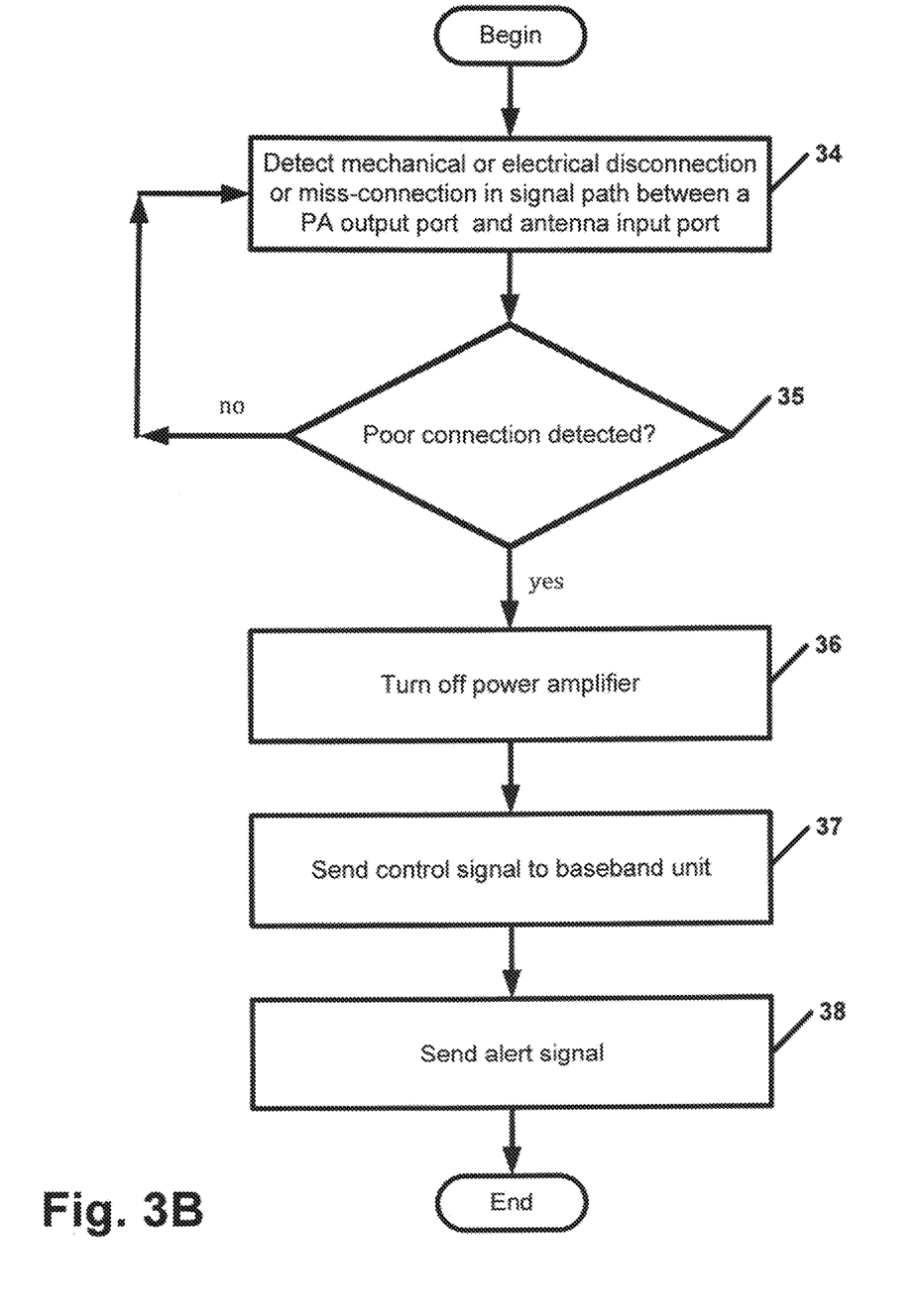
FIG. 3B is a flow diagram of a process for detecting an electrical connection between an RRH and an external antenna.

Referring now to FIG. 3A, a flow diagram of a process for protecting components (e.g., a PA) in transmit signal path of an RRH upon RRH start-up begins with processing block 30 and decision block 32 which implements a loop in which once a good mechanical and/or electrical connection (i.e. a fully coupled connection is detected) is detected in an RF signal path between an output port of a PA and an input port of an antenna, processing proceeds to processing block 32 in which the one or more power amplifiers in the RRH transmit signal path are turned on. This may be accomplished, for example, by applying bias voltages (such as a drain bias voltage Vdd) to the one or more PAs. In alternate embodiments, rather than turning on a PA, a protection system may simply allow a previously withheld RF signal to be provided to an input of the one or more PAs.

In embodiments, processing may also include generating a control signal and providing the control signal to a processor such as a baseband unit as shown in processing block 33. The baseband unit may then generate and provide an alert signal and/or a status signal as shown in processing block 33.

In embodiments, the RRH may directly generate the alert or status signal rather than sending a signal such that the baseband unit generates the alert or status signal.

Thus, in embodiments, the PA powers on upon completion of a fully coupled connection between the RRH and an external antenna.

Referring now to FIG. 31, a flow diagram of a process for protecting components (e.g., a PA) in transmit signal path of an already operating RRH begins with processing block 30 and decision block 32 which implements a loop in which once a faulty mechanical and/or electrical connection (i.e. a less than fully coupled connection is detected) is detected in an RF signal path between an output port of a PA and an input port of an antenna, processing proceeds to processing block 34 in which the one or more power amplifiers in the RRH transmit signal path are turned off. This may be accomplished, for example, by removing bias voltages (such as a drain bias voltage Vdd) from the PA. In alternate embodiments, rather than turning off a PA, a protection system may simply prevent an RF signal from being provided to an input of the PA.

In embodiments, processing may also include generating a control signal and providing the control signal to a processor such as a baseband unit as shown in processing block 36. The baseband unit may then generate and provide an alert signal as shown in processing block 38.

In embodiments, the RRH may directly generate the alert signal rather than sending a signal such that the baseband unit generates the alert signal.

In embodiments, rather than powering off a PA in an RRH transmit signal path, the default may be that a PA powers on upon completion of a fully coupled connection between the RRH and an external antenna.

Figure 4A:
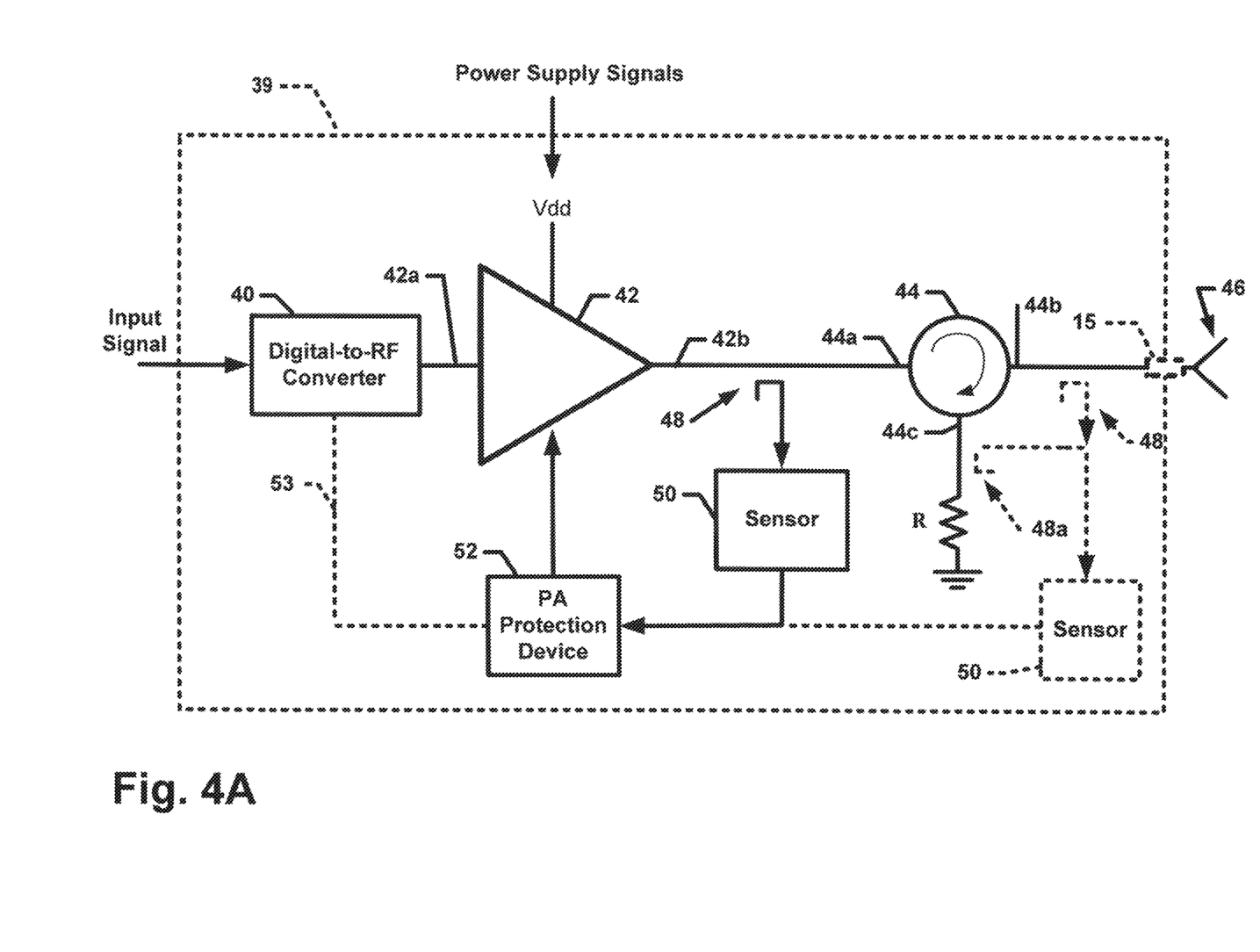
FIG. 4A is a block diagram of a sensor coupled between an output port of a power amplifier and a transmit port of an antenna.

Referring now to FIG. 4A, an RRH 39 comprises a digital-to-RF converter 40 configured to receive an input signal (e.g., a digital input signal such as an I, Q signal which may, for example, be provided from a baseband unit such as baseband unit 12 in FIG. 1). In response to input signals provided thereto, digital-to-RF converter 40 provides an RF signal to an input of one or more RRH transmit paths with one illustrative transmit path being shown in FIG. 4.

In the example illustrated in FIG. 4A, the RRH transmit path comprises an RF amplifier, here illustrated as an RF power amplifier (PA) 42 having an RF input 42a coupled to the output of the digital-to-RF converter 40 and an RF output 42b coupled to antenna 46 through a protection device 44.

In the example embodiment of FIG. 4A, protection device 44 is illustrated as a circulator 44 having a first port 44a coupled to PA output port 42b and a second circulator port 44b coupled to an antenna 46 via connection 15. An RF signal path is thus provided from the PA output 42b to an input of antenna 46 via RF connection 15. A third circulator port 44c is coupled to a matched load R such that RF signals propagating toward RF amplifier output port 42b (e.g., reflected from antenna 46) are directed, via the circulator, toward the load R and terminated.

Thus, in the embodiment of FIG. 4A, the RF amplifier is coupled through a circulator (or other protection device) to an RF port of an antenna. An RF coupler 48 (or other RF signal sensing device) couples or otherwise detects a portion of any RF signals which are reflected from the input port of the circulator and propagate toward the output port 42b of the RF amplifier 42. Such reflected signals may be due, for example, to an impedance mismatch between the output impedance of the RF amplifier and the input impedance of the circulator port to which the RF amplifier output port is coupled (i.e. an impedance mismatch (or difference) between the impedance at the output port of the RF amplifier and the impedance at the port of the circulator to which the RF amplifier output port is coupled).

A sensor 50 (which may, for example, be a detector or comparator) receives a signal from coupler 48. If the magnitude of the signal received by the sensor (either in voltage or power) exceeds a predetermined threshold level, then senor 50 provides a signal to a protection device which prevents the RF amplifier from being turned on (or if the RF amplifier is already turned on, the protection device may turn off the RF amplifier). Such action(s) may be taken to prevent the RF amplifier from being damaged due to exposure to an RF signal received at the RF amplifier output port 42b (e.g. an RF signal reflected from the circulator back toward the RF amplifier. Alternatively, as indicated by dashed line 53, PA protection device 52 may operate to deny or prevent an RF signal from being provided to the input 42a of PA 42 (e.g., by turning off digital-to-RF converter 40 or by de-coupling digital-to-RF converter 40 from PA input 42a).

In embodiments, rather than arranging coupler 48 between the PA output port 42b and circulator port 44a, a coupler 48 may be disposed between circulator output port 44c and termination R which is coupled to circulator port 44c (e.g. as illustrated by coupler 48a which is shown on phantom in FIG. 4A). As above, coupler 48a may provide a signal to a sensor (or detector or comparator) which in turn may provide a signal to protection device 52.

Figure 4B:
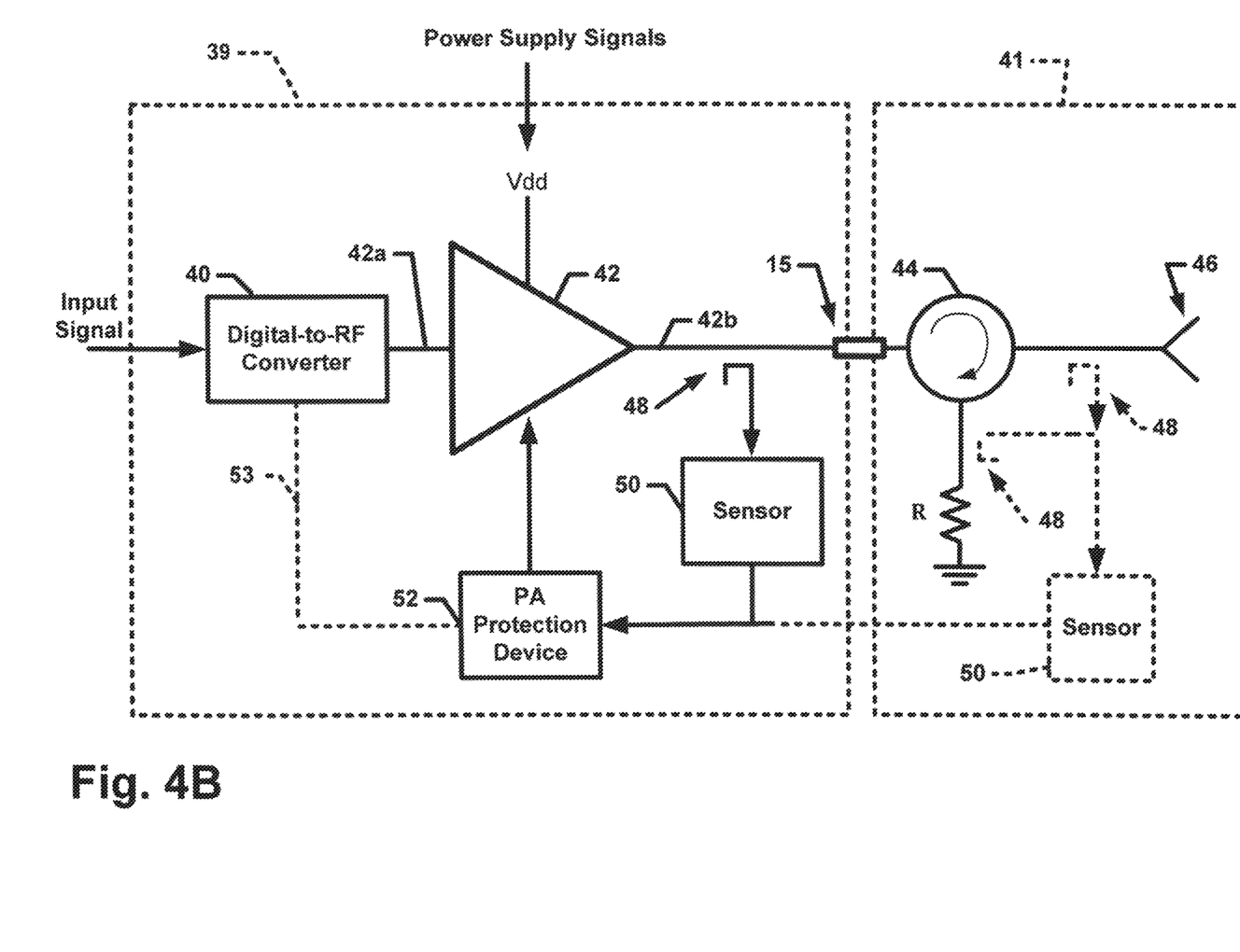
FIG. 4B is a block diagram of an alternate embodiment of a sensor coupled between an output port of a power amplifier and a transmit port of an antenna.

Referring now to FIG. 4B in which like elements of FIG. 4A are provided having like reference designations, in this illustrative embodiment circulator 44 is provided as part of antenna assembly 41 and a connector 15 couples RRH section 39 to an antenna assembly 41. In embodiments, antenna assembly 41 may be considered or referred to as a second RRH section. Thus, in embodiments, connector 15 is coupled between PA output port 42b and circulator port 44a.

In this illustrative embodiment, coupler 48 is coupled between PA output port 42b and connector 15. As described above, coupler 48 is configured to couple RF signals propagating toward the PA output port 42b. Thus, in this case, coupler 48 may couple RF signals reflected from or through connector 15 (e.g. as a result of a poor or broken RF connector or connection) and propagating toward PA output port 42b.

Figure 4C:
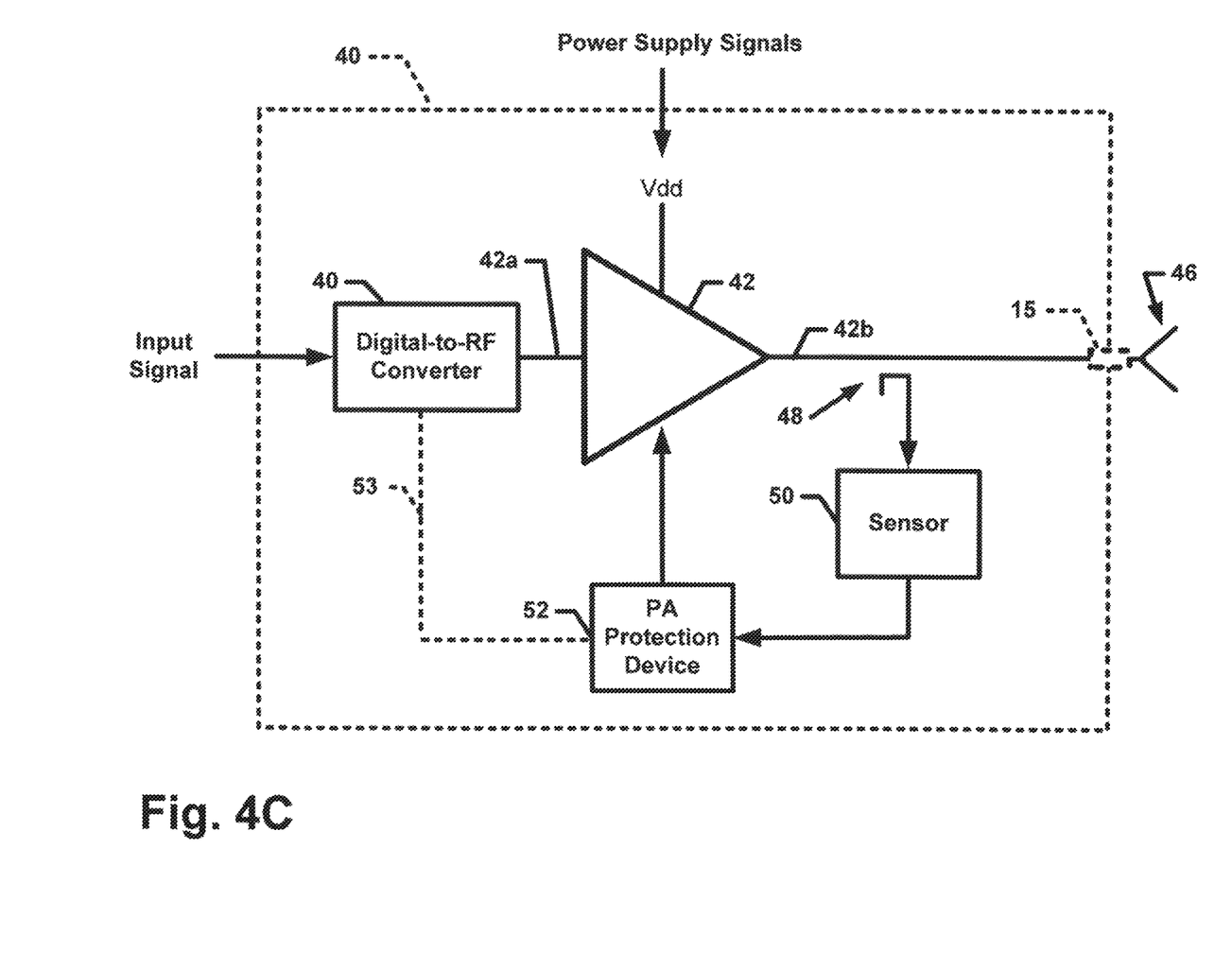
FIG. 4C is a block diagram of an alternate embodiment of a sensor coupled between an output of a power amplifier and a transmit port of an antenna.

Referring now to FIG. 4C in which like elements of FIGS. 4A and 4B are provided having like reference designations, in this illustrative embodiment the RRH transmit path does not include a circulator (i.e., circulator 44 is omitted from the RRH). This is made possible via the use of coupler 48, sensor 50 and protection device 52. That is, by including coupler 48, sensor 50 and protection device 52 in the RRH, it is possible to provide an RRH which does not include a circulator (or T/R switch or other protection device) in the signal path between the PA output port and the antenna port. Thus, in thus illustrative embodiment, connector 15 is coupled between PA output port 42b and antenna port 46a without any intervening circulator or T/R switch in between.

In this illustrative embodiment, coupler 48 is coupled between PA output port 42b and connector 15. As described above, coupler 48 is configured to couple RF signals propagating toward the PA output port 42b. Thus, in this case, coupler 48 may couple RF signals reflected from or through connector 15 (e.g. as a result of a poor or broken RF connector or connection) and propagating toward PA output port 42b.

Figure 5:
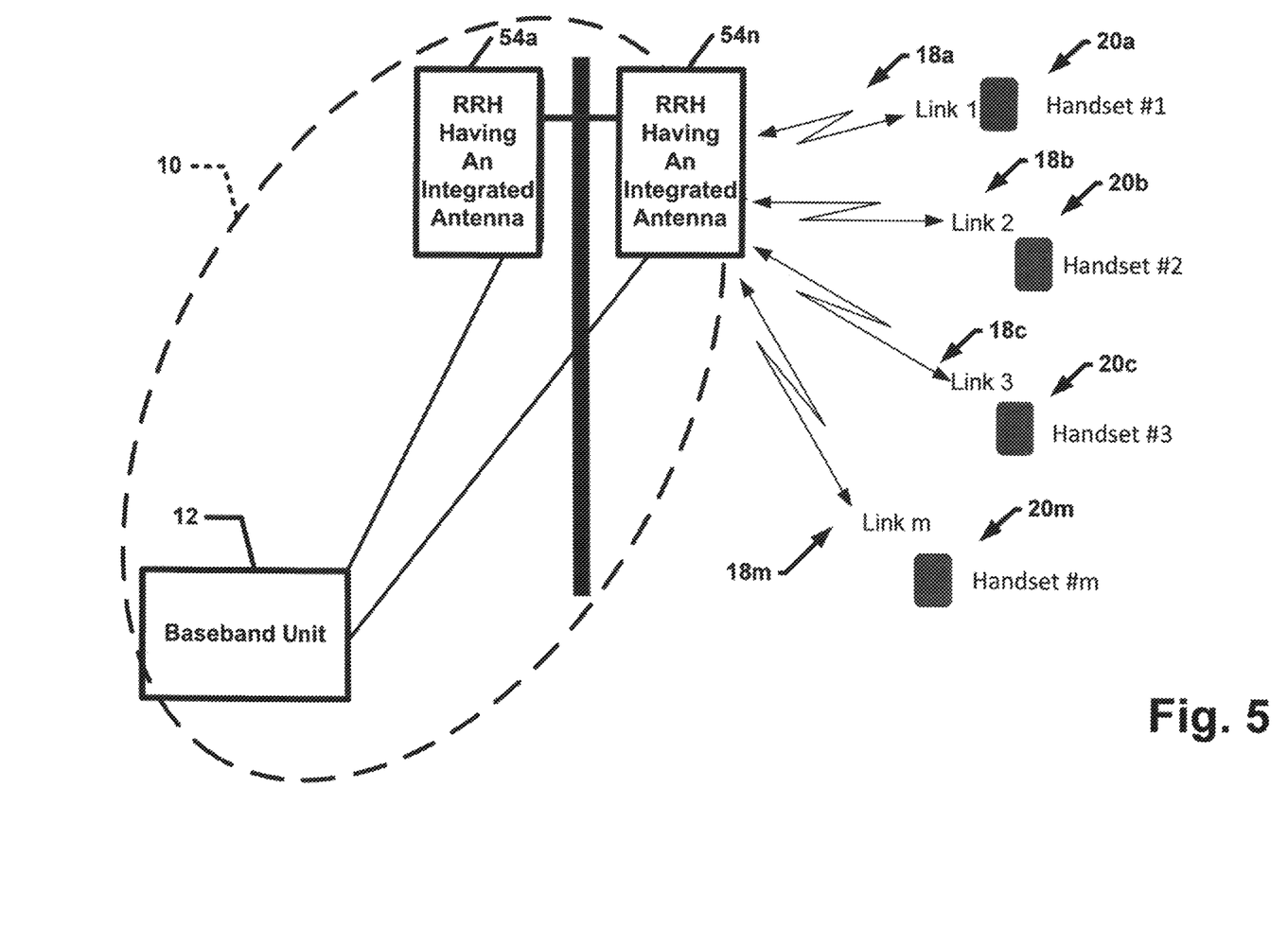
FIG. 5 is a block diagram of an example wireless communication system including a baseband unit and one or more remote radio heads (RRHs) with integrated antennas.

Referring now to FIG. 5, in which like elements of FIG. 1 are provided having like reference designations, in this example embodiment system 10 comprises one or more RRHs 54a-54n (generally denoted 54) having one or more integrated antennas. RRHs 54a-54n are thus sometimes referred to as herein as integrated RRHs 54a-54n. Integrated RRHs 54 communicate over links 18a-18m with mobile handsets 20a-20m. The integrated RRHs may comprise one or more MIMO antennas.

Figure 6:
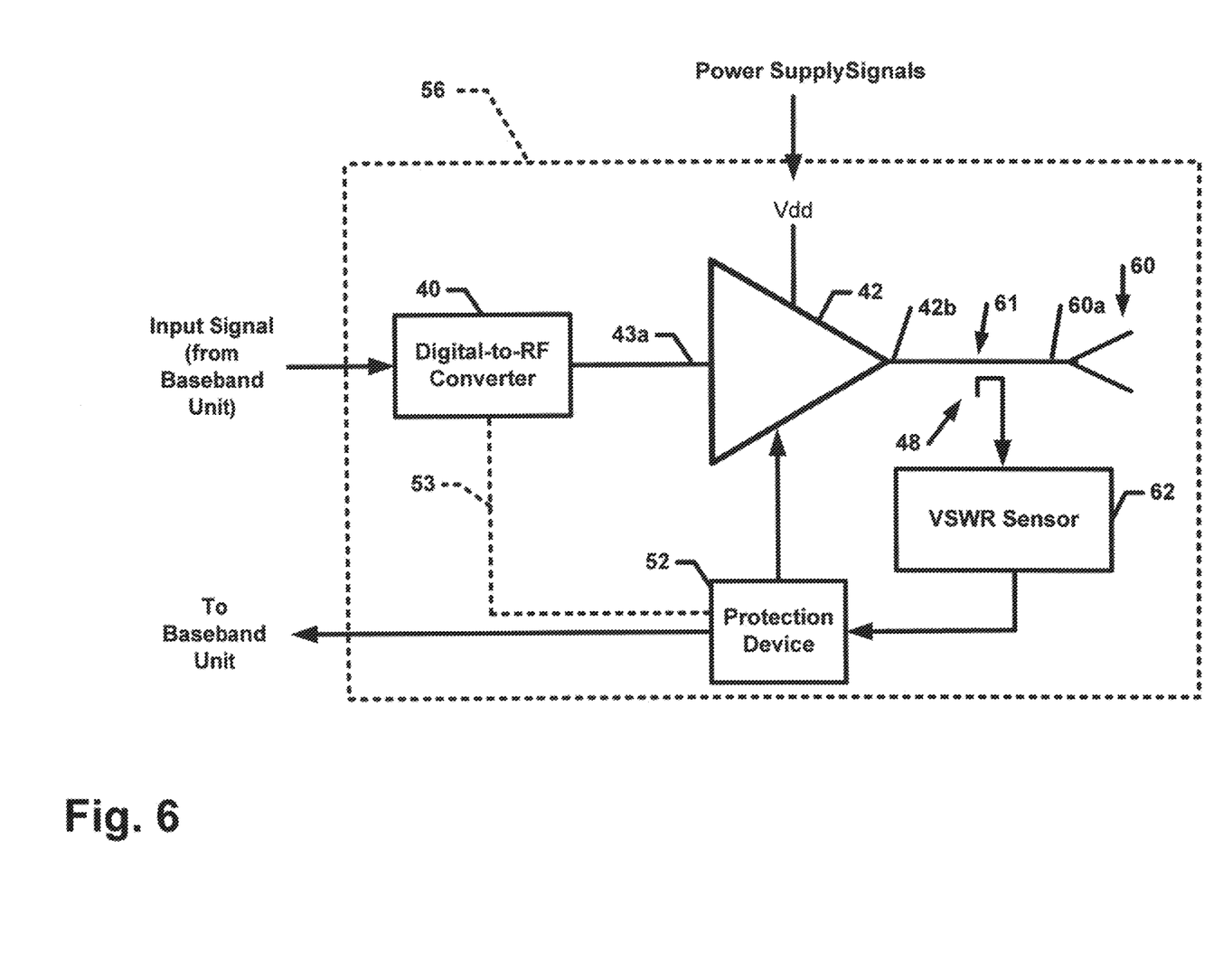
FIG. 6 is a block diagram of an RRH having an integrated antenna.

Referring now to FIG. 6, an integrated RRH 56 which may be the same as or similar to integrated RRHs 54a-54m in FIG. 5, comprises digital-to-RF converter 40 configured to receive an input signal (e.g., a digital input signal such as an I, Q signal which may, for example, be provided from a baseband unit such as baseband unit 12 in FIG. 1). In response to input signals provided thereto, digital-to-RF converter 40 provides an RF signal to an input of one or more RRH transmit paths with one illustrative transmit path being shown in FIG. 6.

In the example illustrated in FIG. 6, the RRH transmit path comprises an RF amplifier 42, here illustrated as an RF power amplifier (PA) 42 having an input 42a and an output 42b. PA output 42b is coupled to a port 60a of antenna 60 via an RF transmission line 61. Transmission line 61 may be implemented as any of a stripline transmission line, a microstrip transmission line, coplanar waveguide transmission line or any other type of RF transmission line.

RF coupler 48 (or other RF signal sensing device) couples or otherwise detects a portion of any RF signals which are reflected from the input port 60a of antenna 60 and propagate via transmission line 61 toward the PA output port 42b. Such reflected signals may be due, for example, to an impedance mismatch between the output impedance of the RF amplifier and the input impedance of the circulator port to which the RF amplifier output port is coupled (i.e. an impedance mismatch or impedance difference) between the impedance at the output port of the RF amplifier and the impedance at the port of the circulator to which the RF amplifier output port is coupled).

A sensor (or detector or comparator) 62 receives a signal from coupler 48. If the magnitude of the signal received by the sensor (either in voltage or power) exceeds a predetermined threshold level, then senor 62 provides a signal to protection device 52 which prevents the RF amplifier from damage. This may be accomplished, for example, by preventing RF amplifier from being turned on (or if the RF amplifier is already turned on, the protection device may turn off the RF amplifier). This may be also be accomplished, for example, by protection device 52 operating or functioning to deny or otherwise prevent an RF signal from being provided to input 42a of PA 42 (e.g., by turning off digital-to-RF converter 40 or by de-coupling digital-to-RF converter 40 from PA input 42a, as indicated by dashed line 53).

Such action(s) may be taken to prevent the RF amplifier from being damaged due to exposure to an RF signal received at the RF amplifier output port 42b (e.g. an RF signal reflected from the circulator back toward the RF amplifier). In embodiments, sensor 62 may be implemented as a VSWR sensor. Thus, one or more VSWR sensors may be coupled to receive RF signals, from coupler 48.

Figure 7A:
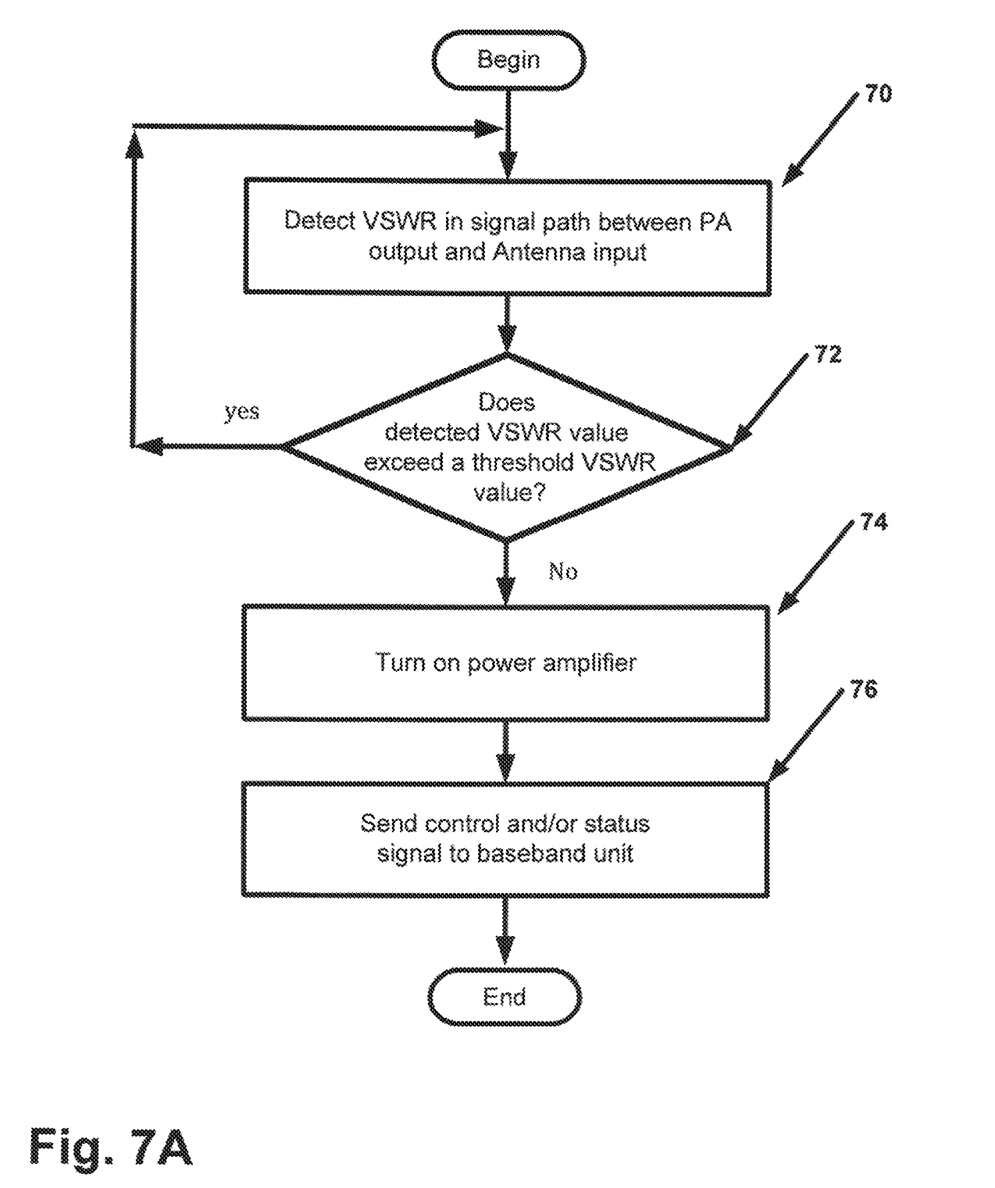
FIG. 7A is a flow diagram of a process for detecting an electrical connection between an RRH and an integrated antenna upon system start-up.

Referring now to FIG. 7A, a process for detecting an electrical connection between an RRH and an integrated antenna upon system start-up begins with processing block 70 and decision block 72 which implements a loop in which once a VSWR is detected which does not exceed a threshold VSWR value, processing proceeds to processing block 74 in which one or more power amplifiers in an RRH transmit signal path are turned on. This may be accomplished, for example, by providing bias voltages (such as a drain bias voltage Vdd) from the PA. In alternate embodiments, rather than turning on one or more PAs via application of bias voltages, a protection system may simply allow an RF signal to be provided to an input of the one or more PAs.

In embodiments, processing may also include generating a control signal and/or a status signal and providing the control signal and/or a status signal to a processor such as a baseband unit as shown in processing block 76. The baseband unit may then generate and provide an alert signal and/or status signal.

In embodiments, the RRH may directly generate the alert signal and/or status signal rather than sending a signal which causes the baseband unit to generate the alert signal and/or status signal.

In embodiments, rather than powering on a PA in an RRH transmit signal path, the default may be that the is already PA powered on and upon completion of a fully coupled connection between the RRH and an external antenna, an RF signals is provided to the PA.

Figure 7B:
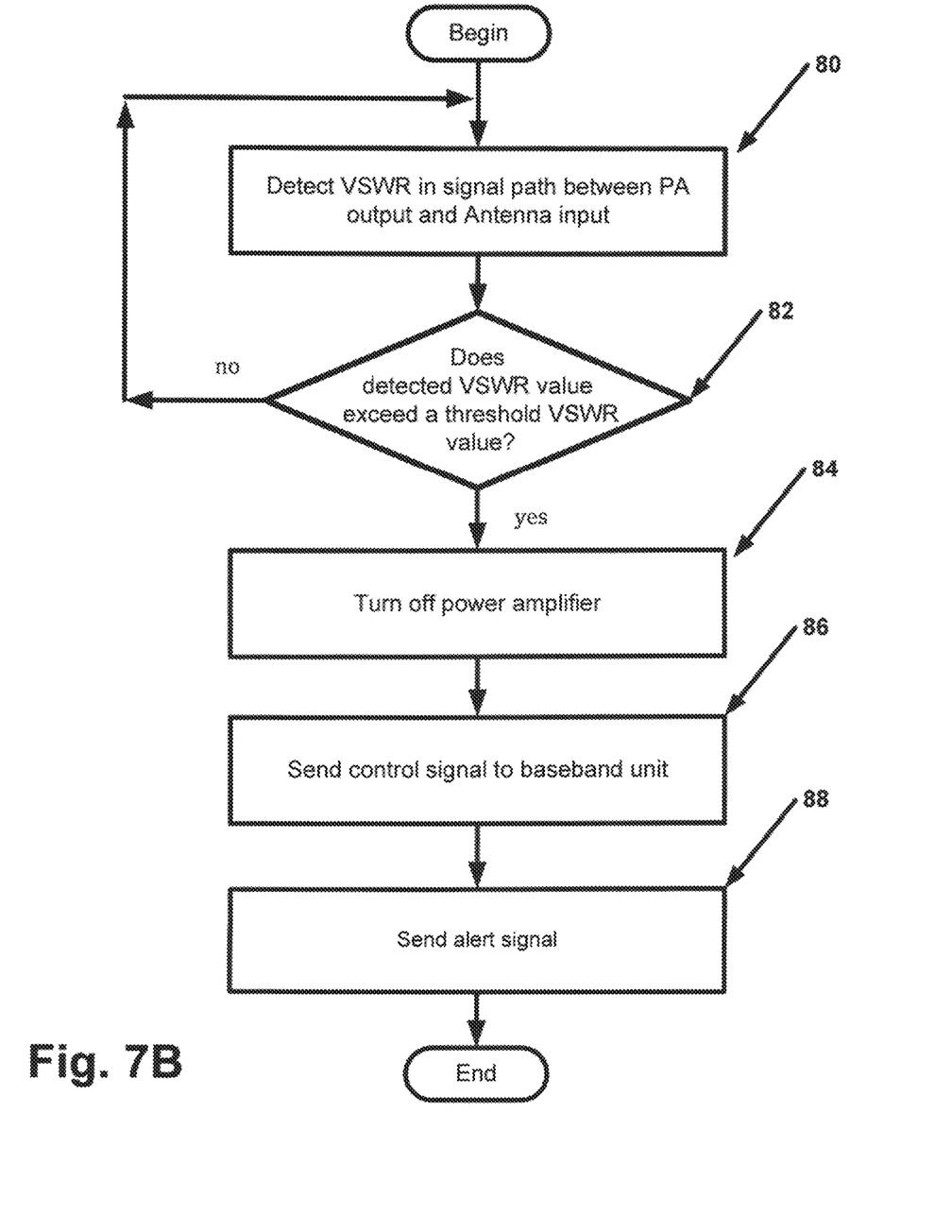
FIG. 7B is a flow diagram of a process for detecting an electrical connection between an RRH and an integrated antenna.

Referring now to FIG. 7B, a flow diagram of a process for protecting components (e.g., a PA) in transmit signal path of an RRH begins with processing block 80 and decision block 82 which implements a loop in which once a VSWR is detected which exceeds a threshhold VSWR value, processing proceeds to processing block 84 in which the one or more power amplifiers in the RRH transmit signal path are turned off. This may be accomplished, for example, by removing bias voltages (such as a drain bias voltage Vdd) from the PA. In alternate embodiments, rather than turning off a PA, a protection system may simply prevent an RF signal from being provided to an input of a PA.

In embodiments, processing may also include generating a control signal and providing the control signal to a processor such as a baseband unit as shown in processing block 86. The baseband unit may then generate and provide an alert signal as shown in processing block 88.

In embodiments, the RRH may directly generate the alert signal rather than sending a signal such that the baseband unit generates the alert signal.

In embodiments, rather than powering off a PA in an RRH transmit signal path, the default may be that a PA powers on upon completion of a fully coupled connection between the RRH and an external antenna.

Although reference is made herein to particular systems or configurations, it is appreciated that other systems or configurations having similar functional and/or structural properties may be substituted where appropriate, and that a person having ordinary skill in the art would understand how to select such systems or configurations and incorporate them into embodiments which incorporate the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An apparatus for detecting whether an antenna is coupled to an antenna port of a remote radio head (RRH), the apparatus comprising:
   a contact switch configured to be disposed between a port of an antenna and a port of an RRH, wherein the contact switch is further configured to provide a signal path having a low impedance characteristic in response to an antenna being functionally coupled to the RRH antenna port and having a high impedance characteristic in response to an antenna not being functionally coupled to the RRH antenna port.

2. The apparatus of claim 1 wherein the switch comprises a spring-loaded contact switch.

3. The apparatus of claim 1 wherein the contact switch is configured provide a signal path having a substantially short circuit impedance characteristic when the antenna is functionally coupled to the RRH antenna port and having a substantially open circuit impedance characteristic when the antenna is not functionally coupled to the RRH antenna port.

4. The apparatus of claim 1 wherein the contact switch is configured provide a signal path having a substantially open circuit impedance characteristic when the antenna is functionally coupled to the RRH antenna port and having a substantially short circuit impedance characteristic when the antenna is not functionally coupled to the RRH antenna port.

5. The apparatus of claim 1 further comprising means for preventing power from being provided the RRH in response to one or more antennas not being coupled to an antenna port of an RRH.

6. The apparatus of claim 1 further comprising means for preventing an RF signal from being provided to an input of the RRH in response to one or more antennas not being coupled to an antenna port of an RRH.

7. A remote radio head (RRH) having a radio frequency (RF) transmit signal path, the RRH comprising:
   an RF amplifier having an RF input port and an RF output port;
   an antenna having an antenna port coupled to the RF output port of the RF amplifier;
   means for detecting, disposed between the RF output port of the RF amplifier and the antenna port, the means for detecting configured prevent damage to the RF amplifier in response to an impedance mis-match being detected between the RF output port of the RF amplifier and the antenna port.

8. The apparatus of claim 7 wherein the means for detecting, comprises at least one of:
   a mechanical switch;
   a spring-loaded contact switch;
   an optical sensor; and
   a pressure sensor.

9. The apparatus of claim 7 wherein the means for detecting is configured provide a signal path having a substantially short circuit impedance characteristic when the antenna is functionally coupled to the RRH antenna port and having a substantially open circuit impedance characteristic when the antenna is not functionally coupled to the RRH antenna port.

10. The apparatus of claim 7 wherein the means for detecting is configured provide a signal path having a substantially open circuit impedance characteristic when the antenna is functionally coupled to the RRH antenna port and having a substantially short circuit impedance characteristic when the antenna is not functionally coupled to the RRH antenna port.

11. The apparatus of claim 7 further comprising means for preventing power from being provided to the RRH in response to one or more antennas not being coupled to an antenna port of an RRH.

12. The apparatus of claim 7 further comprising means for preventing an RF signal from being provided to the input of the RF amplifier in response to one or more antennas not being coupled to an antenna port of an RRH.

13. The apparatus of claim 7 further comprising means for preventing power from being provided to the RRH power from being provided to the RRH in response to an impedance mis-match being detected between the RF output port of the RF amplifier and the antenna port.

14. The apparatus of claim 7 further comprising means for preventing an RF signal from being provided to the input of the PA in response to an impedance mis-match being detected between the RF output port of the RF amplifier and the antenna port.

* * * * *